Patented Dec. 2, 1930

1,783,304

UNITED STATES PATENT OFFICE

ALEXANDER P. OKATOFF, OF LENINGRAD, UNION OF SOCIALIST SOVIET REPUBLICS

METHOD OF PRODUCING COLLOIDAL SILICIC ACID

No Drawing.   Application filed November 12, 1928. Serial No. 319,022.

My invention relates to methods of preparation of colloidal silicic acid or silicagel and has a particular reference to methods whereby silicagel is produced by mixing silicate of soda with hydrochloric acid.

The object of my invention is to provide a method of preparing silicagel in which the process can be so controlled that the product of different desired properties may be obtained.

At the present time there are two types of silicagel known: one obtained by mixing silicate of soda with hydrochloric acid and allowing the gel to coagulate until it acquires the desired hardness. The other process consists in treating silicate of soda with different salts, such as iron chloride, calcium chloride, etc. At the present time there are two basic methods known for the production of the colloidal-silicic acid: one, developed by W. A. Patrick, and the other, of H. W. Holmes and J. A. Anderson.

The Patrick method consists in interaction between hydrochloric acid and sodium silicate, taken at different temperatures and with different concentrations, producing hydrosol of the silicic acid, which after a while becomes converted into a gel. When the latter becomes sufficiently hard, it is broken into pieces, washed and dried.

The object of the Patrick patent was to fix the conditions of the temperature and concentration of the ingredients used so as to obtain gel of a sufficient hardness with good absorbing properties.

From the point of view of modern chemistry, each gel can be considered as an aggregate of particles of different degrees of dispersion and hydration. According to my research the degree of dispersion and hydration of colloidal complexes is of a considerable importance in obtaining gel with high adsorption properties. I also found that each gel can be considered with a rough schematization as comprising three phases: (1) solid, with a small content of water, (2) semi-liquid, highly hydrated, and (3) liquid, consisting of a dispersion medium with a small content of dispersion phase.

The amount of semi-liquid phase varies as the gel becomes aged.

It was also observed that water during the washing process removes the liquid phase and part of the highly hydrated semi-liquid phase with a result that the active internal surface of gel becomes later decreased.

On the basis of these discoveries I came to the conclusion that the moment when the gel is ready or "ripe" is determined not by the moment when it becomes hard, as it was stated by Patrick, but the beginning of the synæresis, i. e., when gel begins to be covered at the surface with liquid phase and cracks. The amount of semiliquid phase forming an inner thin gel structure is noticeably reduced in comparison with gel which was not subjected to the synæresis process, and the semiliquid phase in this degree of gel readiness is not removed by water in the washing process.

Therefore the preparation of gel in its first stage is reduced to the following: to the solution of hydrochloric acid is added, continuously mixing, the solution of sodium silicate in such proportion that the reaction after adding water glass solution will remain acid. It is then left standing until the gel begins to be covered with a liquid (serum) and begins to crack.

In my method I add to the hydrochloric acid, vigorously mixing, solution of silicate of soda or waterglass, in a quantity insufficient for the full neutralization of the acid. These solutions may be used of different degree of concentration and at different temperatures.

The maximum content of the free acid in water in relation to the amount of hydrogen chloride used should not exceed 25%.

The beginning and development of the process of synæresis, or the contraction of the colloid, is used in my process as an indication that the gel is ready for further treatment and that the first part of the process is completed. In this respect my method differs from the existing known method in which the process is considered completed when the gel becomes hardened.

The gel formed by the above process and dried to the desired degree of moisture content is treated with solutions of salts of polybasic acids of different metals with ammonia together or separately. This treatment may require from a few minutes to several days, depending on the size of pieces of gel. Upon completion of this treatment the salts are removed by washing with water.

The washed gel is dried at a room temperature and then activated in drying apparatus, or it may be treated directly in driers in which the temperature is gradually raised. For this purpose the temperature control must admit variations from about 50 to 500 degrees centigrade. The gel may be also treated with boiling water in order to increase its activity or to produce fine grains.

The activity of gel is controlled principally by varying its moisture content from 40 to about 95%.

With the relative proportions of acid and waterglass as described I obtain a slowly coagulating gel containing 7½% or more of the silicic acid. As mentioned above, after neutralization of the basic salts there should be left not more than 25% of the hydrogen chloride originally contained in the acid.

My method with the described modifications produces colloidal silicic acid or silicagel of varying degrees of activity, occupying a middle position between products obtained by other methods.

Important advantages of my process are its simplicity and ease of control of the properties of the final product.

I claim as my invention:

A process of producing colloidal silicic acid, consisting in mixing sodium silicate with hydrochloric acid, determining the beginning of the readiness of the gel by the beginning of the synæresis, treating said gel with solutions of salt of polybasic acids of metals together with ammonia thereby partly neutralizing said hydrochloric acid in said gel.

Signed at Berlin, in the Province of Brandenburg and State of Russia, this 20th day of October, A. D. 1928.

ALEXANDER P. OKATOFF.